United States Patent [19]
Sato

[11] Patent Number: 5,903,768
[45] Date of Patent: May 11, 1999

[54] PIPELINED MICROPROCESSOR AND LOAD ADDRESS PREDICTION METHOD THEREFOR

[75] Inventor: Toshinori Sato, Tokyo, Japan

[73] Assignee: Kabushiki Kaisha Toshiba, Kawasaki, Japan

[21] Appl. No.: 08/742,911

[22] Filed: Nov. 1, 1996

[30] Foreign Application Priority Data

Nov. 7, 1995 [JP] Japan .................................. 7-288769

[51] Int. Cl.$^6$ ..................................................... G06F 1/00
[52] U.S. Cl. .............................. 395/800.01; 395/800.24; 395/800.28; 395/800.41
[58] Field of Search ...................... 395/800.01, 800.09, 395/800.1, 800.28, 800.24, 800.41

[56] References Cited

U.S. PATENT DOCUMENTS

| | | | |
|---|---|---|---|
| 4,901,236 | 2/1990 | Utsumi | 364/200 |
| 5,404,552 | 4/1995 | Ikenaga | 395/800 |
| 5,412,786 | 5/1995 | Kusano | 395/375 |
| 5,475,823 | 12/1995 | Amerson et al. | 395/496 |
| 5,706,459 | 1/1998 | Atsushi | 395/376 |

OTHER PUBLICATIONS

Golden et al., "Hardware Support for Hiding Cache Latency", University of Michigan Technical Report, pp. 3–21, Jan. 13, 1995.

Eickemeyer et al., "A load–instruction unit for pipelined processors", IBM J. Res. Develop, vol. 37, No. 4, pp. 547–564, Jul. 4, 1993.

Austin et al., "Zero–Cycle Loads: Microarchitecture Support for Reducing Load Latency", Proceedings of the 28th Annual International Symposium on Microarchitecture.

*Primary Examiner*—Eric Coleman
*Assistant Examiner*—Mackly Monestime
*Attorney, Agent, or Firm*—Foley & Lardner

[57] ABSTRACT

A pipelined microprocessor is a capable of avoiding pipeline stalls caused by data hazards in which a load instruction information registration section 1 registers information relating to load instructions into a load instruction information storing section 3 in advance, an address calculation section 3 calculates a predicted load address before accessing a load address obtained by executing the load instruction by a pipeline processing section, a calculation result judgement section 7 judges whether or not the predicted load address is correct. Thereby, following instructions will use data as the execution result of the load instruction.

18 Claims, 18 Drawing Sheets

FIG.1
PRIOR ART

| IF | ID | EX | MA | WB |

ADD     R3, R1, R2

SUB     R6, R4, R5
```

FIG.3
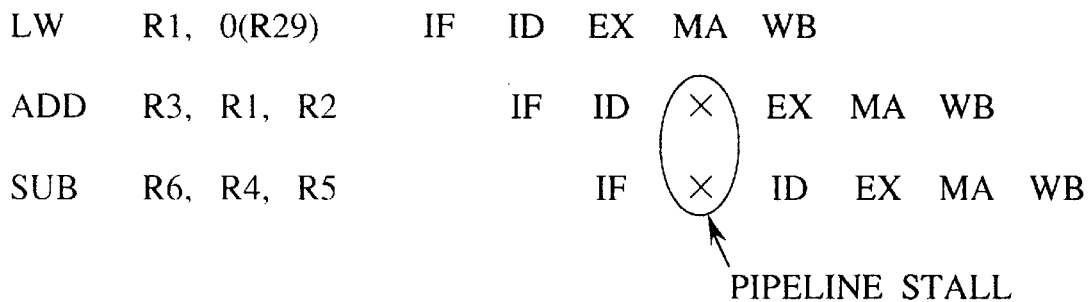
```
LW    R1, 0(R29)    IF  ID  EX  MA  WB
ADD   R3, R1, R2        IF  ID  ⊗  EX  MA  WB
SUB   R6, R4, R5            IF  ⊗  ID  EX  MA  WB
                                    ↑
                                PIPELINE STALL
```
FIG.4
```
LW    R1, 0(R29)    IF  ID  EX  MA  WB
SUB   R6, R4, R5        IF  ID  EX  MA  WB
ADD   R3, R1, R2            IF  ID  EX  MA  WB
```
FIG.5
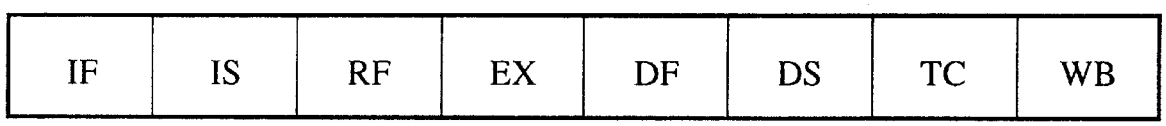
| IF | IS | RF | EX | DF | DS | TC | WB |

FIG.7

| ADDRESSES | INSTRUCTIONS | |
|---|---|---|
| 0x1234 | ADD  R3, R1, R2 | ; R1+R2 ⟶ R3 |
| 0x1238 | LW   R10, 0(R9) | ; MEM(R9) ⟶ R10 |
| 0x123C | ADD  R5, R3, R10 | ; R3+R10 ⟶ R5 |

FIG.9

| INSTRUCTION ADDRESSES | REGISTER NUMBERS |
|---|---|
| | |
| 0x1 2 3 4 | R 9 |
| | |

| IF | ID | EX | DF | DS | TC | WB |

FIG.10

FIG.11
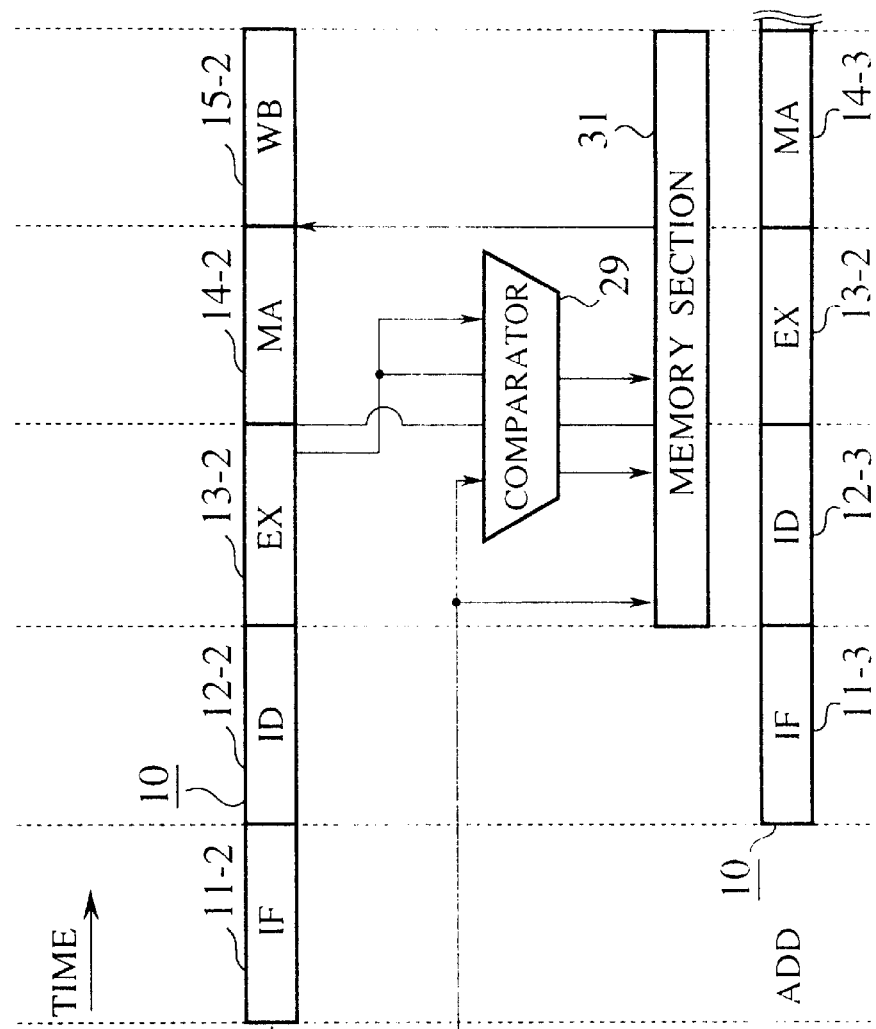
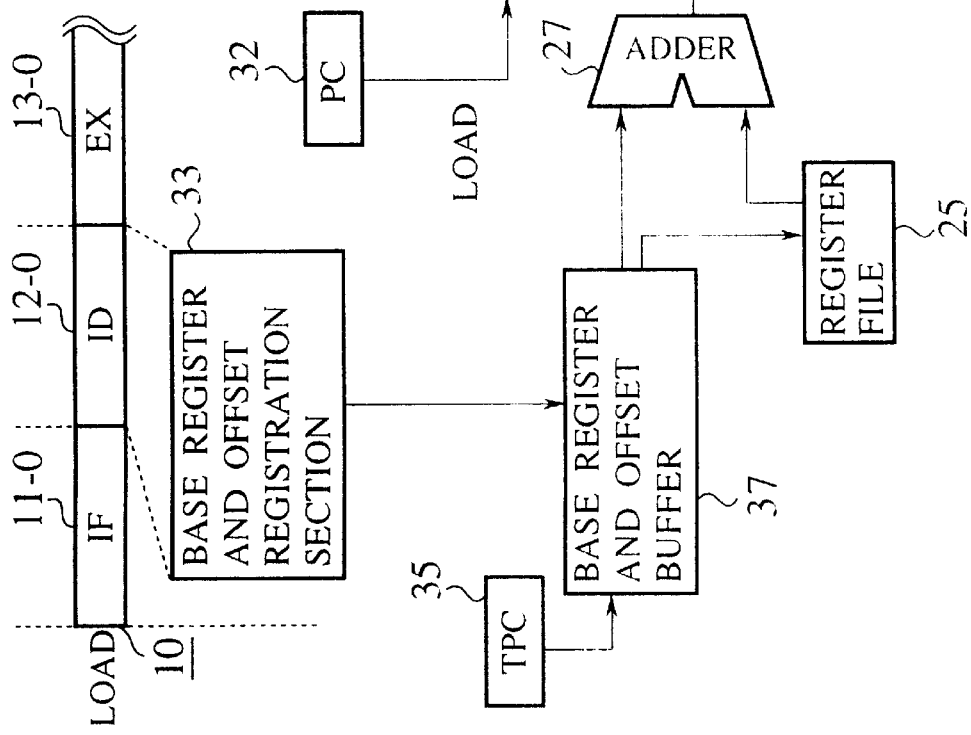

FIG.12

| INSTRUCTION ADDRESSES | REGISTER NUMBERS | OFFSETS |
|---|---|---|
| 0x1234 | R9 | 0 |

FIG.14

| INSTRUCTION ADDRESSES | BASE ADDRESSES |
|---|---|
|  |  |
| 0x1 2 3 4 | 0x8000 |
|  |  |

FIG.17

| INSTRUCTION ADDRESSES | LOAD ADDRESSES |
|---|---|
| | |
| 0x1 2 3 4 | 0x8080 |
| | |

PIPELINED MICROPROCESSOR AND LOAD ADDRESS PREDICTION METHOD THEREFOR

BACKGROUND OF THE INVENTION

1. Field of the Invention

The present invention relates to a pipelined microprocessor and a load address prediction method used in the pipelined microprocessor, and more particularly, it relates to a pipelined microprocessor and a load address prediction method for the pipelined microprocessor which are capable of avoiding occurrences of pipeline stall or bubble caused by data hazards.

2. Description of Related Art

Recently, most high speed pipelined microprocessors are formed based on pipeline designs in order to achieve high performance computing. This pipelining is an implementation technique in modern art.

This pipeline processing or computing executes a part of an instruction in one stage. However, there is the pipeline hazard to reduce performance of a pipelined microprocessor.

As the types of this pipeline hazard, there are following three types (1) to (3):

(1) Structural hazards;

(2) Data hazards; and (3) Control hazards.

The structural hazard arises from resource conflicts, the data hazards arise when the execution of an instruction depends on the results of a previous instruction, and the control hazard arises from discontinuity of executions of instructions such as branch instructions in pipeline processing and the like.

Those hazards reduce performance of pipelining processing because those hazards, the structure hazards, the data hazards and the control hazards make it caused to disturb the flows of the pipelining processing. There is a data hazard caused by execution of load instructions.

FIG. 1 is a diagram showing a pipeline of five stages used in the microprocessor R3000. In FIG. 1, IF designates an instruction fetch stage, ID denotes an instruction decode and register fetch stage, EX indicates an execution and effective address calculation stage, MA designates an memory access stage and WB denotes a write back stage.

Hereinafter, we will now explain the data hazard caused from load instructions with referring to FIG. 1 which shows the five stage pipeline structure.

At first, we will consider a data hazard caused by a load instruction based on an instruction sequence shown in FIG. 2.

In the example shown in FIG. 2, the LW instruction does not read out data item from a memory until the MA stage is completed. On the other hand, the ADD instruction requires a data item that is also read out by the LW instruction at the same timing as the timing of the MA stage executed in the LW instruction. Therefore, the data hazard is occurred. In order to avoid the occurrence of the data hazard, the following two methods (4) and (5) are used:

(4) The pipeline inter-lock; and (5) The instruction scheduling.

The pipeline interlock is that an occurrence of the data hazard is detected and execution of pipeline processes are halted until the hazards are eliminated.

In the case of the LW instruction shown in FIG. 2, executions of following instructions are halted until the target data item is read out from a memory.

FIG. 3 shows an example of the pipeline stall. In general, performance of a pipelined microprocessor is reduced during a pipeline stall because no instruction is executed.

The instruction scheduling is a method in which an execution sequence of instructions is changed by using an compiler in order to avoid an occurrence of the pipeline stall. For example, the instruction sequence shown in FIG. 2 can be re-arranged in order to avoid the occurrence of the hazard, namely the pipeline stall. If the hazard can not be eliminated, the compiler insert an NOP (no operation) into the instruction sequence. This NOP reduces the performance of the pipelined microprocessor because the NOP executes no operation.

Today, a memory access operation is divided into and then performed in a plurality of stages according to increasing of execution speed of pipelined microprocessors because the memory access operation does not be completed in one cycle. For example, the microprocessor R4000 requires three stages (DF, DS, TC) shown in FIG. 5 in order to execute a memory access operation.

When a plurality of stages are required for a memory access operation, the time period of a pipeline inter-lock caused by an instruction hazard becomes long. This causes the decreasing of performance of the pipelined microprocessor. For example, there is the literature "Performance evaluation of GHz-Class for RISC pipeline architecture", Japan IEICE technical report. Computer systems, CPSY95-4, pp.25–32, 1995 which reports that approximately 10 percentages in the entire execution time of the microprocessor R4000 is used for processing pipeline stalls based on load hazards.

Furthermore, the method based on the instruction scheduling has a limit. For example, there is a literature, "IMPACT: AN ARCHITECTURAL FRAMEWORK FOR MULTIPLE-INSTRUCTION-ISSUE PROCESSORS", PROC. OF 18TH ANN.INT'L SYM. ON COMPUTER ARCHITECTURE, PP.266–275, JUNE, 1991, which reported that performance of a super-scalor processor is decreased by approximately 30 percentages because the number of instructions to be used for an instruction scheduling is lacking.

As described above, the pipeline stalls caused by the data hazards and the like reduces the performance of the conventional pipelined microprocessors accompanying with increasing of the number of memory access cycles in the trend toward increasing the operation speed of pipelined microprocessors.

SUMMARY OF THE INVENTION

Accordingly, an object of the present invention is, with due consideration to the drawbacks of the conventional pipelined microprocessor, to provide a pipelined microprocessor which is capable of eliminating occurrences of the pipeline stalls caused by data hazards and a load address prediction method used for the pipelined microprocessor.

In accordance with one aspect of the present invention, a pipelined microprocessor controlled by a pipeline comprises: a pipeline processing section for executing instructions; a memory section for storing various types of data items used for executions of the instructions; a load instruction information registration section for registering information of load instructions for loading data from the memory section in the instructions; a load instruction information storing section for storing the information of the load instructions which will load the data from the memory section; an address calculation section for calculating a predicted load address during a stage before an access stage to a load address to be used in execution of the load instruction by the pipeline processing section; a calculation result judgement section for judging whether the predicted load address calculated by the address calculation section is correct or not; and an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct, wherein a following instruction after the load instruction is executed by using the data transferred from the memory section.

In the pipelined microprocessor having the above configuration, the load instruction information registration section registers information relating to load instructions into the load instruction information storing section in advance, and the address calculation section calculates a predicted load address a stage before accessing a load address obtained by execution of the load instruction performed in the pipeline processing section.

The calculation result judgement section judges whether or not the calculation result, namely the predicted load address, is correct or not, the data output section outputs data stored in a memory field in the memory section addressed by the correct load address. This makes it possible to get required data loaded by the load instruction during executing of a following instruction and it can be avoided to happen pipeline stalls caused by data hazards. Here, the term "before accessing to the load address" includes this cycle itself in addition to stages before the cycle accessed by the pipeline processing section.

In the pipelined microprocessor as another aspect of the present invention, the load instruction information registration section registers a register number of a register for storing a base address for the load address and an address of an instruction which is executed before the execution of the load instruction which are related to each other, the load instruction information storing section stores the register number and the instruction address and outputs the register number corresponding to an instruction address received by the load instruction information storing section, and the address calculation section calculates the predicted load address in a stage before the pipeline processing section accesses a load address in the execution of a load instruction by using both the register number provided from the load instruction information storing section and an offset value in the load instruction.

In the pipelined microprocessor having the above configuration, the load instruction information registration section registers a register number of a register for storing a base address of a load address and an instruction address to be executed before the load instruction as the load instruction information to the load instruction information storing section. These data items are related to each other. The load instruction information storing section provides a register number corresponding to an address to be accessed when it has stored the address. The register file is accessed based on the register number obtained from the load address information storing section in order to get a base address of the load address. An operand in the load instruction provides an offset of the load address. The predicted load address calculation section calculates a predicted load address by using the base address and the offset described above. The pipeline processing section accesses the memory section by using the predicted load address in order to get a required data item and the data output section outputs a predetermined data. On the other hand, the calculation result judgement section compares the predicted load address and the calculated value. When both are equal, no processing is required. When both the predicted load address and the calculated value are not equal, the pipeline processing section accesses the memory section in order to get required data by using the actual calculated data because no predicted load address is correct. By the operation of the pipelined microprocessor having the above configuration, it can be avoided to happen pipeline stalls caused by data hazards because a following instruction can use data loaded by the load instruction.

In the pipelined microprocessor as another preferred embodiment of the present invention, the load instruction information storing section outputs the register number corresponding to the instruction address received at an instruction fetch stage executed by the pipeline processing section. Thus, it is preferable to apply the configuration of the pipelined microprocessor according to the present invention to a pipelined microprocessor having complicated programs because an instruction address of a load instruction is related to a register number by the load instruction information storing section when the register number is provided in an instruction fetch stage.

In the pipelined microprocessor as another preferred embodiment of the present invention, the load instruction information registration section registers a register number of a register for storing a base address of the load address and an address of a load instruction which are related to each other.

The pipelined microprocessor as another preferred embodiment of the present invention, further comprises a load address prediction program counter for indicating an instruction address for an instruction to be executed, wherein the load instruction information registration section registers a register number of a register storing a base address of a load address, an offset in a load instruction and an instruction address of the load address which are related to each other to the load instruction information storing section, the load instruction information storing section stores the register number, the offset value, the instruction address which are related to each other and outputs the register number and the offset value related to an instruction address pointed by a load address prediction program counter, and the address calculation section calculates a predicted load address before an access stage in which the pipeline processing section accesses a load address in a load instruction execution by using both a base address and an offset stored in the register file corresponding to the register number transferred from the load instruction information storing section.

In the pipelined microprocessor having the configuration described above, the load instruction information registration section registers a register number of a register for storing a base address of a load address, an offset value included in the load instruction, and an instruction address of the load address which are related to each other. Thereby, a predicted load address can be get earlier because an offset value in the load instruction is not referred. In addition, it can be acceptable to incorporate a counter in addition to a program counter in the pipelined microprocessor in order to control a timing of the calculation of a predicted load address.

In the pipelined microprocessor as another preferred embodiment according to the present invention, the load instruction information registration section registers a base address of a load address and an instruction to be executed before the load instruction which are related to each other to the load instruction information storing section, the load instruction information storing section stores the base address and the instruction address which are related to each other and outputs the base address corresponding to an instruction address received by the load instruction information storing section, and the address calculation section calculates a predicted load address before an access stage in which the pipeline processing section accesses a load address in a load instruction execution by using both a base address transferred from the load instruction information storing section and an offset value included in the load instruction.

In the pipelined microprocessor having the above configuration, the load instruction information storing section stores a base address of a load instruction and an instruction executed prior to the execution of the load instruction, which are related to each other, as information relating to load instructions is stored, into the load instruction information section.

Thus, by using the base address of the load instruction, the processing efficiency of the pipelined microprocessor can be increased because it can be eliminated to access the register file.

In addition, in the pipelined microprocessor as another preferred embodiment according to the present invention, the load instruction information storing section outputs a base address corresponding to the instruction address received at the instruction fetch stage.

As described above, the pipelined microprocessor of the present invention requires no accessing to the register file and can output the base address at the instruction fetch stage. Accordingly, it is preferable to apply the configuration of the pipelined microprocessor of the present invention to a microprocessor having complicated programs because the load instruction information storing section stores the instruction address of the load instruction and a register number which are related to each other.

In accordance with another aspect of the present invention, a pipelined microprocessor controlled by a pipeline comprises: a pipeline processing section for executing instructions; a memory section for storing various types of data items used for executions of the instructions; a load instruction information registration section for registering load addresses for load instructions loaded from the memory section; a load instruction information storing section for storing load addresses the information of the load instructions which will load the data from the memory section; an address calculation section for calculating a predicted load address during a stage before an access stage to a load address to be used in execution of the load instruction by the pipeline processing section; a calculation result judgement section for judging whether the predicted load address calculated by the address calculation section is correct or not; and an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct, wherein a following instruction after the load instruction is executed by using the data transferred from the memory section.

In the pipelined microprocessor having the above configuration, the load instruction information storing section registers a load address of a load instruction. A load address buffer as the load instruction information storing section stores the load address transferred from the load instruction information registration section and outputs a load address corresponding to a received instruction address. Thereby, it is not required to calculate a predicted load address and no address calculation section is incorporated. When comparing to microprocessors of another preferred embodiments, the pipelined microprocessor of this embodiment can further reduce a hardware size.

Furthermore, in the pipelined microprocessor as another preferred embodiment, the load instruction information storing section outputs a load address corresponding to the instruction address which is received at an instruction fetch stage. That is, a load address can be provided at an instruction fetch stage because it is not required to calculate a predicted load address and an instruction address of a load instruction can be related to a load address by incorporating the load address buffer as the load instruction information storing section. Accordingly, the configuration of the pipelined microprocessor of this embodiment can be applicable to a microprocessor having complicated programs.

The pipelined microprocessor as another preferred embodiment of the present invention, further comprises a load address prediction program counter for indicating an instruction address for an instruction to be executed, wherein the load instruction information registration section registers a load address for the load instruction and an instruction address which are related to each other, and the load instruction information storing section stores the related load address and the instruction address which are related to each other transferred from the load instruction information registration section, and outputs a load address corresponding to the instruction address pointed by the load address prediction program counter.

As the registration method used in the load instruction information registration section, a repeated processing method such as a loop type processing, a while-do type processing, a repeat-until type processing and the like are commonly used. In this case, the load instruction information registration section registers information about a load instruction which is repeatedly executed in the instructions at a first execution to the load instruction information storing section.

In accordance with another aspect of the present invention, a pipelined microprocessor controlled by a pipeline comprises: a pipeline processing section for executing instructions; a memory section for storing various types of data items used for executions of the instructions; an address calculation section for calculating a predicted load address by using a predetermined base address and an offset included in a load instruction during a stage before an access stage to a load address to be used in execution of the load instruction by the pipeline processing section; a calculation result judgement section for judging whether the predicted load address calculated by the address calculation section is correct or not; and an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct, wherein a following instruction after the load instruction is executed by using the data transferred from the memory section.

In the pipelined microprocessor having the above configuration, the address calculation section receives the predetermined base address number. Accordingly, it is not required to incorporate a buffer used for storing the load instruction information, so that the hardware size of the pipelined microprocessor can be reduced.

In the pipelined microprocessor as another preferred embodiment, the calculation result judgement section inputs a predetermined value instead of the predicted load address obtained from the address calculation section and then the judgement whether the predicted load address is correct or not.

In the pipelined microprocessor having the above configuration, the calculation result judgement section receives the predetermined load address. Thereby, it is not required to incorporate the address calculation section into the pipelined microprocessor, so that the hardware size of the pipelined microprocessor can be further reduced.

In accordance with one aspect of the present invention, a load address prediction method for a pipelined microprocessor controlled by a pipeline, comprises: a load instruction information registration step for registering load instruction information in instructions to be executed; a predicted load address calculation step for calculating a predicted load address in a stage performed before an access stage for a load address obtained by executing a load instruction by using the load instruction information; a calculation result judging step for judging whether or not the predicted load address is correct; an output step for outputting data corresponding to the predicted load address when the predicted load address is correct and for outputting data corresponding to the load address obtained by executing the load instruction when no predicted load address is correct; and an instruction execution step for executing following instructions after the load instruction by using the data obtained at the output step.

In the load address prediction method of the pipelined microprocessor described above, information relating to load instructions is stored in the load instruction information registration step in advance, and a predicted load address is calculated at an address calculation step before accessing to a load address obtained by the execution of the load instruction. it can be avoided to happen pipeline stalls caused by data hazards because data loaded by the load instruction can be obtained when a following instruction is executed after the load instruction.

In addition, it is preferable that the load instruction information registration step is performed by using the load instruction information including at least a register number of a register for storing a base address of the load address. Further, it is also preferable that in the address calculation step, the load address is calculated by using the register number corresponding to an instruction address received at an instruction fetch stage.

Moreover, it is preferable that the load instruction information registration step is performed by using the load instruction information including al least a base address of the load address or the load address.

In accordance with another aspect of the present invention, a load address prediction method for a pipelined microprocessor controlled by a pipeline, comprises: a predicted load address calculation step for calculating a predicted load address in a stage performed before an access stage for a load address obtained by executing a load instruction by using a predetermined base address or an offset included in the load instruction; a calculation result judging step for judging whether or not the predicted load address is correct; an output step for outputting data corresponding to the predicted load address when the predicted load address is correct and for outputting data corresponding to the load address obtained by executing the load instruction when no predicted load address is correct; and an instruction execution step for executing following instructions after the load instruction by using the data obtained at the output step.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 1 is a diagrams showing a pipeline structure including five stages;

FIG. 2 is a diagram showing an instruction sequence which causes a load hazard;

FIG. 3 is an explanation diagram showing the inter lock of a pipeline;

FIG. 4 a diagram showing an instruction scheduling;

FIG. 5 s a pipeline structure in the microprocessor R4000;

FIG. 7 is a diagram showing a program used for explanation of the operation of pipelined microprocessors according to preferred embodiments of the present invention;

FIG. 9 is an explanation diagram showing a configuration of the base register buffer 23 incorporated in the pipelined microprocessor 100 shown in FIG. 8;

FIG. 10 is a diagram showing a pipeline construction including seven stages;

FIG. 11 is a block diagram showing a configuration of the pipelined microprocessor 200 according to the second embodiment;

FIG. 12 is an explanation diagram showing a configuration of a buffer 37 for storing base registers and offsets incorporated in the pipelined microprocessor 200 shown in FIG. 11;

FIG. 14 is an explanation diagram showing the configuration of the base address buffer 41 incorporated in the pipelined microprocessor 300 according to the third embodiment shown in FIG. 13;

FIG. 17 is an explanation diagram showing the configuration of the load address buffer 45 incorporated in the pipelined microprocessor 500 shown in FIG. 16;

DESCRIPTION OF THE PREFERRED EMBODIMENTS

Other features of this invention will become apparent through the following description of preferred embodiments which are given for illustration of the invention and are not intended to be limiting thereof.

Preferred embodiments of a pipelined microprocessor and a load address prediction method used for the pipelined microprocessor according to the present invention will now be described with reference to the drawings.

Basic configuration.

Figure 6A:
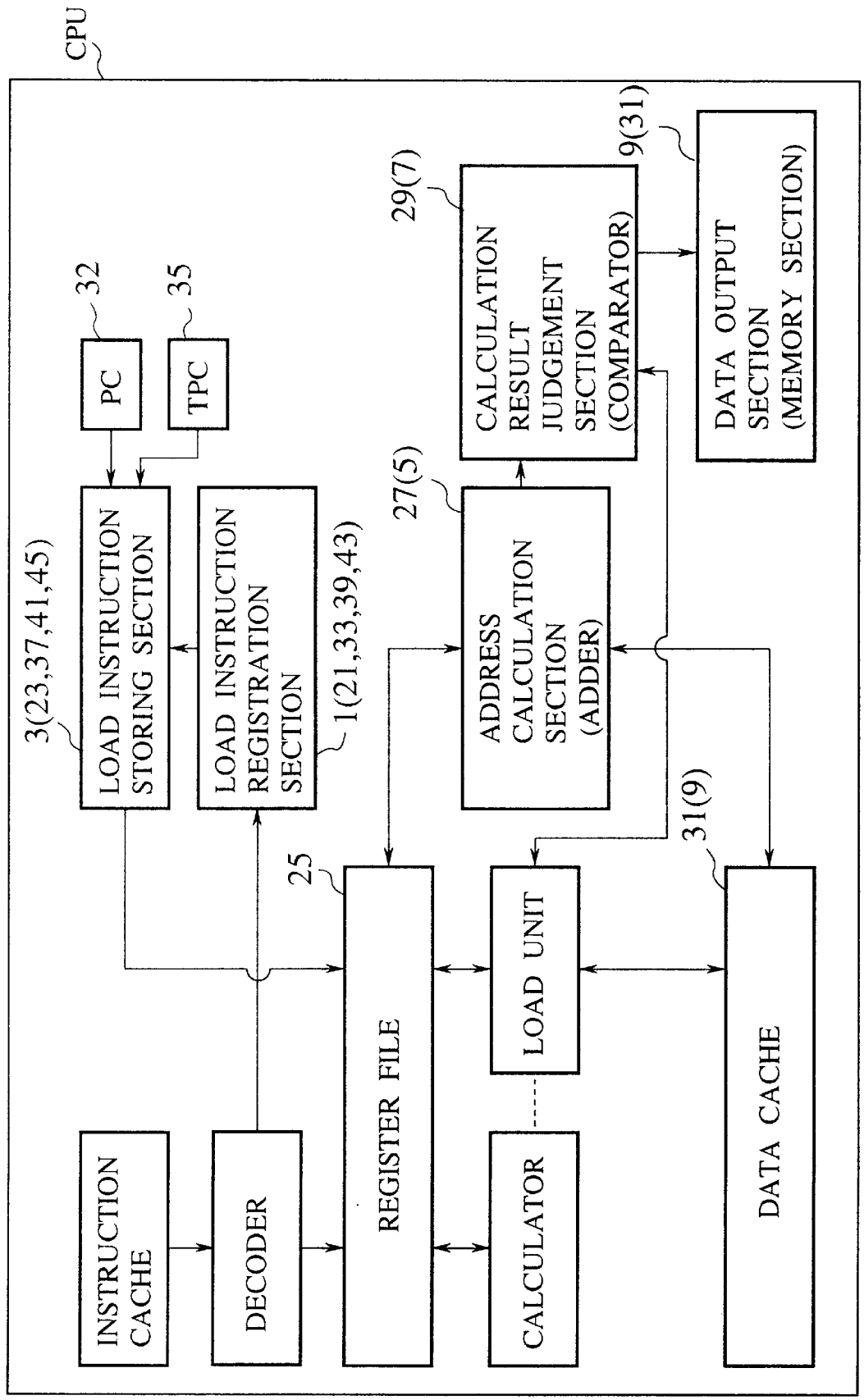
FIG. 6A is a block diagram showing a basic configuration of a pipelined microprocessor according to the present invention.
Figure 6B:
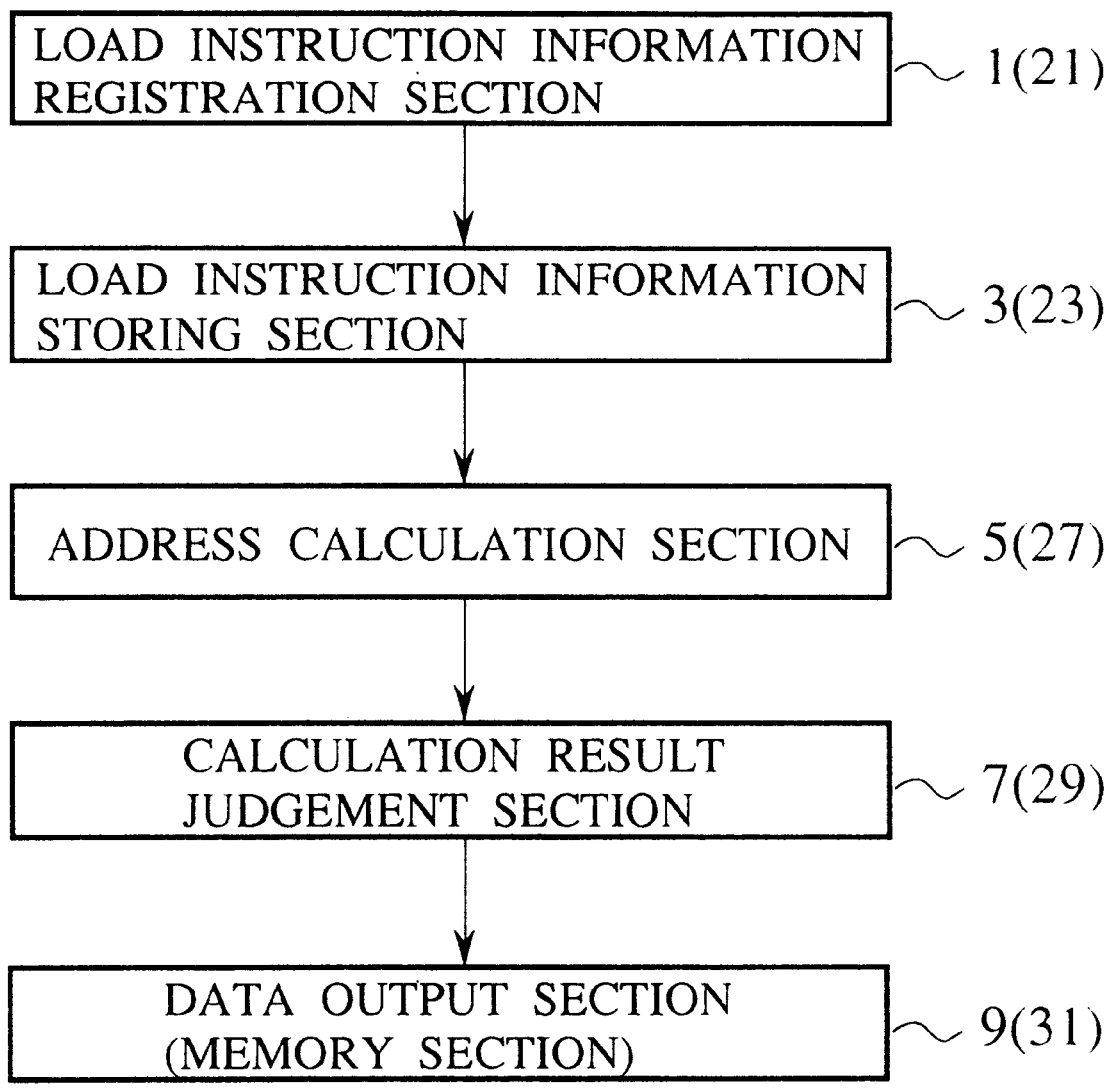
FIG. 6B is a process flow of each of components forming the pipelined microprocessor having the basic configuration according tithe present invention shown in FIG. 6A.

FIG. 6A is a block diagram showing a basic configuration of a pipelined microprocessor according to the present invention. FIG. 6B is a process flow of each of components forming the pipelined microprocessor having the basic configuration according to the present invention shown in FIG. 6A.

As shown in FIG. 6A, the pipelined microprocessor according to the present invention having the basic configuration which is capable of processing instructions based on a pipeline control. That is, like conventional microprocessors, the pipelined microprocessor comprises: instruction caches, data caches, an arithmetic unit, a load unit, a program counter 32, memories 31, a register file 25, and the like. In addition to this configuration, the pipelined microprocessor of the present invention further comprises: a load instruction information storing section 3 (specifically, a base register buffer 23, a base register and offset buffer 37, a base address buffer 41, or a load address buffer 45), a load information registration section 1 (specifically, a base register registration section 21, a base register and offset registration section 33, a base address registration section 39, or a load address registration section 43), an address calculation section (specifically, an adder 27), a calculation result judgement section 7 (specifically, a comparator 29), a target program counter (TPC) 35. In particular, reference numbers in parentheses in FIG. 6A and FIG. 6B designate reference numbers of corresponding configuration elements used in preferred embodiments according to the present invention which will be explained later. In addition, because FIG. 6A shown the basic configuration of the pipelined microprocessor according to the present invention, the pipelined microprocessor of each of preferred embodiments comprises the combination of the configuration elements shown in FIGS. 6A and 6B.

The pipelined microprocessor shown in FIGS. 6A and 6B is a microprocessor based on a pipeline control which includes a pipeline processing section (not shown in FIGS. 6A and 6B, but it will be shown in each embodiment described later) for executing instructions; a memory section for storing various kinds of data items to be used for the various types of instructions; the load instruction information registration section 1 for registering information of a load instruction, which will load data from the memory section, in the instructions; the load instruction information storing section 3 for storing the load instruction information registered by the load instruction information section 1; the address calculation section 5 for calculating a predicted load address by calculation before accessing a load address obtained by executing of the load instruction at the pipeline processing section; the calculation result judging section for judging whether the predicted load address calculated by the address calculation section 5 is correct or not; and the output section 9 for outputting data stored in the memory section addressed by the predicted load address when the predicted load address is correct and for outputting data stored in the memory addressed by a load address obtained by execution of the load instruction when the predicted load address is incorrect. The pipelined microprocessor of the present invention having the configuration described above can execute instructions which use the data from the output section 9.

FIG. 7 is a diagram showing a program used for explanation of the operation of microprocessors according to preferred embodiments of the present invention.

At the left side and the right side in FIG. 7, instruction addresses and instructions corresponding to the instruction addresses are shown respectively. For example, the instruction "ADD R3, R1, R2" is stored in the memory field addressed by the instruction address "0x1234".

At the right side from the reference character ";" in FIG. 7, comments indicating explanation for those instructions are described.

First embodiment.

Figure 8:
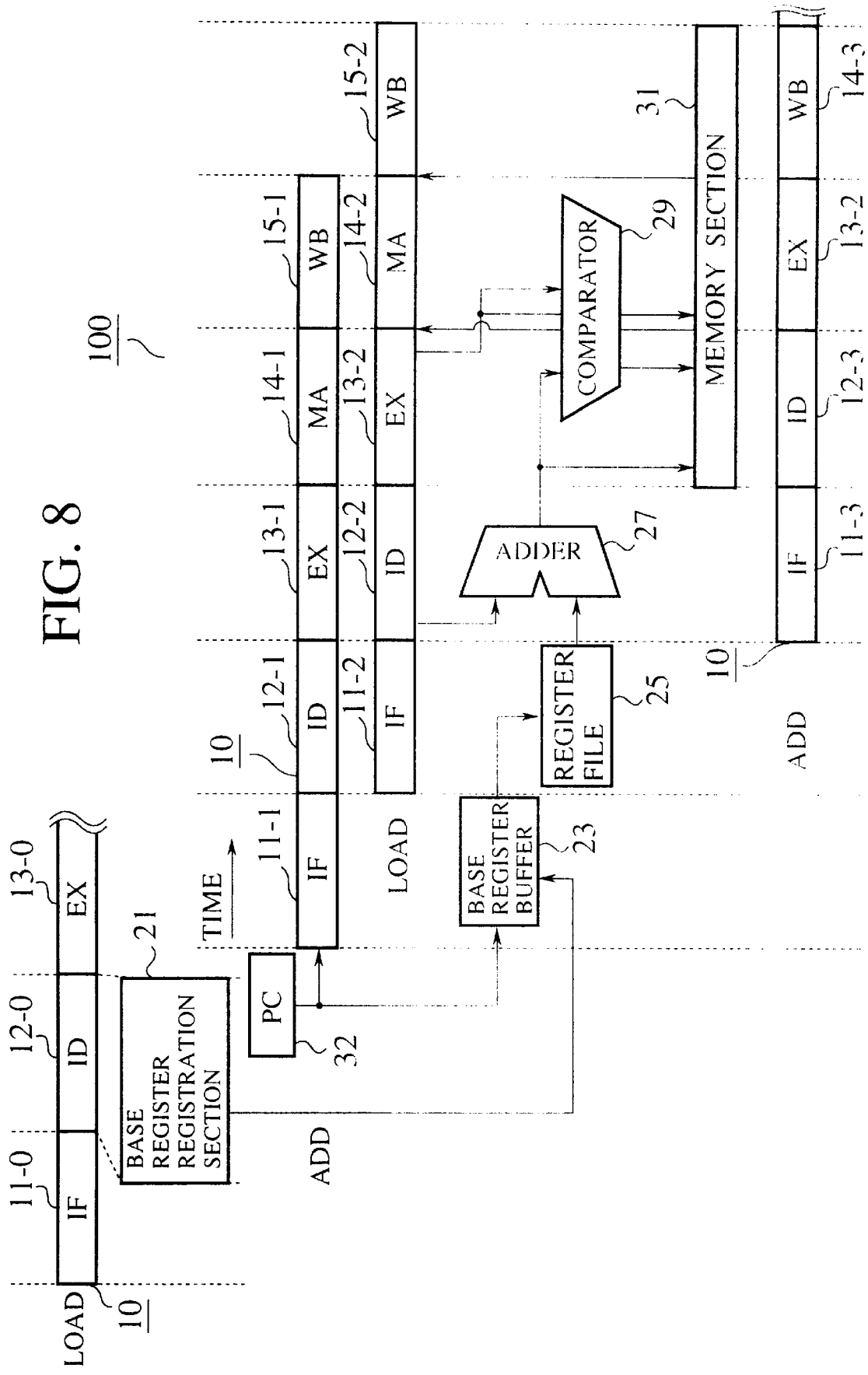
FIG. 8 is a block diagram showing a configuration of the pipelined microprocessor 100 according to the first embodiment.

FIG. 8 is a block diagram showing a configuration of the pipelined microprocessor 100 according to the first embodiment of the present invention using the pipeline of five stages, like the microprocessor R3000 shown in FIG. 1.

As shown in FIG. 8, the pipelined microprocessor of the first embodiment comprises: a pipeline processing section 10, a memory section 31, a base register buffer 23, a register file 25, an adder 27, a program counter (PC) 32 and a comparator 29.

The pipeline processing section 10 performs instructions. At IF stage 11 (11-0, 11-1, . . . ), an instruction to be executed is read out. At ID stage 12 (12-0, 12-1, . . . ), the instruction is decoded and the register file 25 is accessed in order to get required data items to be used in the execution of calculation for the instruction. At EX stage 13 (13-0, 13-1, . . . ), an arithmetic operation is carried out. An actual address is get at the EX stage 13.

At MA stage 14 (14-0, 14-1, . . . ), data items are read from/write into the memory section 31. At WB stage 15 (15-0, 15-1, . . . ), data items obtained by the calculation operation or read out from the memory section 31 are written into the register file 25.

The base register registration section 21 registers a register number to be used by the load instruction and an instruction address which is one ahead of the instruction address used for the load instruction into the base register buffer 23 one by one.

The base register buffer 23 receives the instruction address from the PC 32 and outputs a register number corresponding to an instruction address if the instruction address has already stored in the base register buffer 23 itself. FIG. 9 is an explanation diagram showing the configuration of the base register buffer 23 incorporated in the pipelined microprocessor 100 shown in FIG. 8. Here, the base register buffer 23 is formed so that it outputs a register number when an instruction address used for an ADD instruction which is the instruction of one ahead of a load instruction is received.

The register file 25 is used for storing a required value for calculation and for receiving a register number transferred from the base register buffer 23 and for outputting a base address stored in the register.

The adder 27 calculates and then outputs a predicted load address based on an offset written in an operand in an instruction.

The comparator 29 compares the predicted load address obtained by the adder 27 with an actual load address calculated in the EX stage 13 in the pipeline processing section 10.

When the comparison result at the comparator 29 is difference, the actual load address is transferred from the pipeline processing section 10 to the memory section 31.

The memory section stores data items. When a load address is provided, the data item corresponding to the load address is outputted.

Next, the pipelined microprocessor 100 of the first embodiment operates based on following procedures (11) to (16):

(11) At the IF stage 11-1 in a preceding ADD instruction, the base register buffer 23 is accessed in order to get the base register number. If the required base register number is not stored in the base register buffer 23, a constant value is read out from the base register buffer 23, for example, a number of a stack pointer ST (not shown).

(12) At the ID stage 12-1 in the ADD instruction, the register file 25 is accessed in order to get a base address. At this time, the following LOAD instruction performs an instruction fetch at the IF stage 11-2.

(13) When the following instruction to be executed is a LOAD instruction, at the ID stage 12-2, the adder 27 calculates a predicted load address by using both the base address obtained by the process (12) at the ID stage 12-2 and an offset value in an operand in the LOAD instruction.

(14) At the EX stage 13-2 in the load instruction, the memory section 31 is accessed in order to get a data item. At the same time, the pipeline processing section 10 calculates an actual address. The comparator 29 comparing the actual address with the predicted address in order to judge whether the predicted address is correct or not. When the address for the ADD instruction is not registered in the base register buffer 23, the base register is registered into the base register buffer 23. In the registration operation, there is a limit based on the limiting of a hardware configuration. When the base register will be registered over the limit value, the registered data which has already been registered is replaced by using the Least Recently Used (LRU) method.

(15) When the address prediction is failure, the memory section 31 is accessed in order to fetch the data item from the memory section 31 at the MA stage 14-2 in the LOAD instruction.

(16) At the ADD instruction in the instruction following the LOAD instruction, the data stored in the memory section 31 is used to perform an arithmetic operation.

In the procedures as described above, the load address is obtained at the ID stage 12, not after the EX stage and the memory section 31 can be accessed at the EX stage 13 not at the MA stage 14, so that a desired data can be obtained in an early stage before the MA stage 14. This makes it possible to reduce occurrences of data hazard and to increase performance of the pipelined microprocessor.

The present invention is not limited only for five stage pipeline micro-processors described above, can be applicable to pipelined microprocessors having another pipeline stages.

Next, the result of simulation executed by the pipelined microprocessor 100 of the first embodiment will now be explained. FIG. 10 is a diagram showing a pipeline construction including seven stages. This simulation uses the seven stages pipeline shown in FIG. 10.

First, an instruction is fetched at the instruction fetch (IF) stage. The fetched instruction is decoded at the instruction decode (ID) stage and the register file is accessed in order to get data items to be required for calculation. The calculation is performed at the EX stage. An actual address can be obtained at the EX stage.

Data items are read out from/written into the memory section 31 at a data cache first (DF) stage, a data cache second (DS) stage and a tag check (TC) stage. At the write back (WB) stage, arithmetic result or the data read out from the memory section 31 is written into the register file 35. The Dhrystone benchmark ver. 2.1 was used for this simulation.

As the result of the simulation, approximately 73.1 percentages of the number of predicted load addresses are corrected when the number of registered load addresses in the base register buffer 23 is 32. Thereby, performance of the pipelined microprocessor 100 of the first embodiment can be increased by approximately 7.7 percentages.

Although it is apparent to increase the prediction ratio when the number of registered load addresses in the base register buffer 23 is increased, the hardware size of the pipelined microprocessor is also increased. This is the trade-off.

Furthermore, it can be acceptable to form the pipelined microprocessor in which the base register buffer 23 outputs a register number corresponding to the instruction address to be received at the instruction fetch (IF) stage.

Second Embodiment.

Next, the configuration and the operation of the pipelined microprocessor 200 of the second embodiment according to the present invention will now be explained.

FIG. 11 is a block diagram showing the configuration of the pipelined microprocessor 200 according to the second embodiment. When comparing the configuration of the pipelined microprocessor 100 of the first embodiment, the pipelined microprocessor 200 of the second embodiment comprises a base register and offset registration section 33 instead of the base register registration section 21, a base register and offset buffer 37 for storing the base register and an offset, and a target program counter (TPC) 35 used for an address prediction. Other components in the pipelined microprocessor 200 of the second embodiment are the same as the pipelined microprocessor 100 in configuration and operation, so that the explanation for those elements are omitted here for brevity.

The registration section 33 for registering base register numbers and offsets. Specifically, the registration section 33 registers register numbers to be used by the load instruction in the first execution (see the pipeline 10 at the upper left side in FIG. 11) and instruction address for the load instruction into the base register and offset buffer 37 one by one.

The buffer 37 for storing base register numbers and offsets receives an instruction address transferred from the TPC 35 and outputs the register number corresponding to the instruction address only when the instruction address has been stored in the buffer 37.

FIG. 12 is an explanation diagram showing the configuration of the buffer 37 for storing base registers and offsets incorporated in the pipelined microprocessor 200 of the second embodiment shown in FIG. 11.

Here, the configuration of the buffer 37 is formed so that the buffer 37 outputs the register number "9" and the offset value "0" when receiving the instruction address "0x1234", as shown in FIG. 12. The TPC 35 is incorporated in the pipelined microprocessor 200 so as to output an instruction address which is different in address position from the instruction address designated by the PC 32. That is, the instruction address pointed by the TPC 35 is separated from the instruction address pointed by the PC32. TPC 35 walks ahead of PC 32.

Next, the operation of the pipelined microprocessor 200 of the second embodiment will now be explained.

The operation of the pipelined microprocessor 200 of the second embodiment performs in the following procedures (21) to (25):

(21) The TPC 35 is formed so as to output an instruction address which may be fetched in the near future.

(22) The buffer 37 for storing base register numbers and offsets outputs the base register number and the offset corresponding to the instruction address transferred from the TPC 35 to the register file 25 and adder 27.

(23) The register file 25 outputs the base address stored in the base register designated by the base register number transferred from the buffer 37.

(24) The adder 27 calculates a predicted load address by using the base address and the offset transferred from the register file 25 and the buffer 37.

(25) After this, like the pipelined microprocessor 100 of the first embodiment, the comparator 29 compares the predicted load address with the actual address and access the memory section 31.

Thus, by incorporating the TPC 35 into a pipelined microprocessor, information including the relationship among an instruction address of a load instruction, a base address and an offset can be registered into the buffer 37 for storing base registers and offsets before the EX stage in the load instruction in advance.

Accordingly, it is preferable to use the pipelined microprocessor 200 of the second embodiment having the configuration described above when a complicated program is used. In addition to this feature, there is an advantage that this configuration of the pipelined microprocessor 200 makes it easily possible to perform maintenance.

Furthermore, it can be executed to calculate a predicted load address before the ID stage in the load instruction (as shown in FIG. 11, the predicted load address can be calculated at any stage before the IF stage 11-2 or the ID stage 12-2 in the LOAD instruction). This is the important advantage of the second embodiment. In other words, the execution of the predicted load address calculation does not wait until the execution of ID stage 12-2 in the load instruction is completed. Thereby, the predicted load address calculation can be performed earlier.

Third Embodiment.

Figure 13:
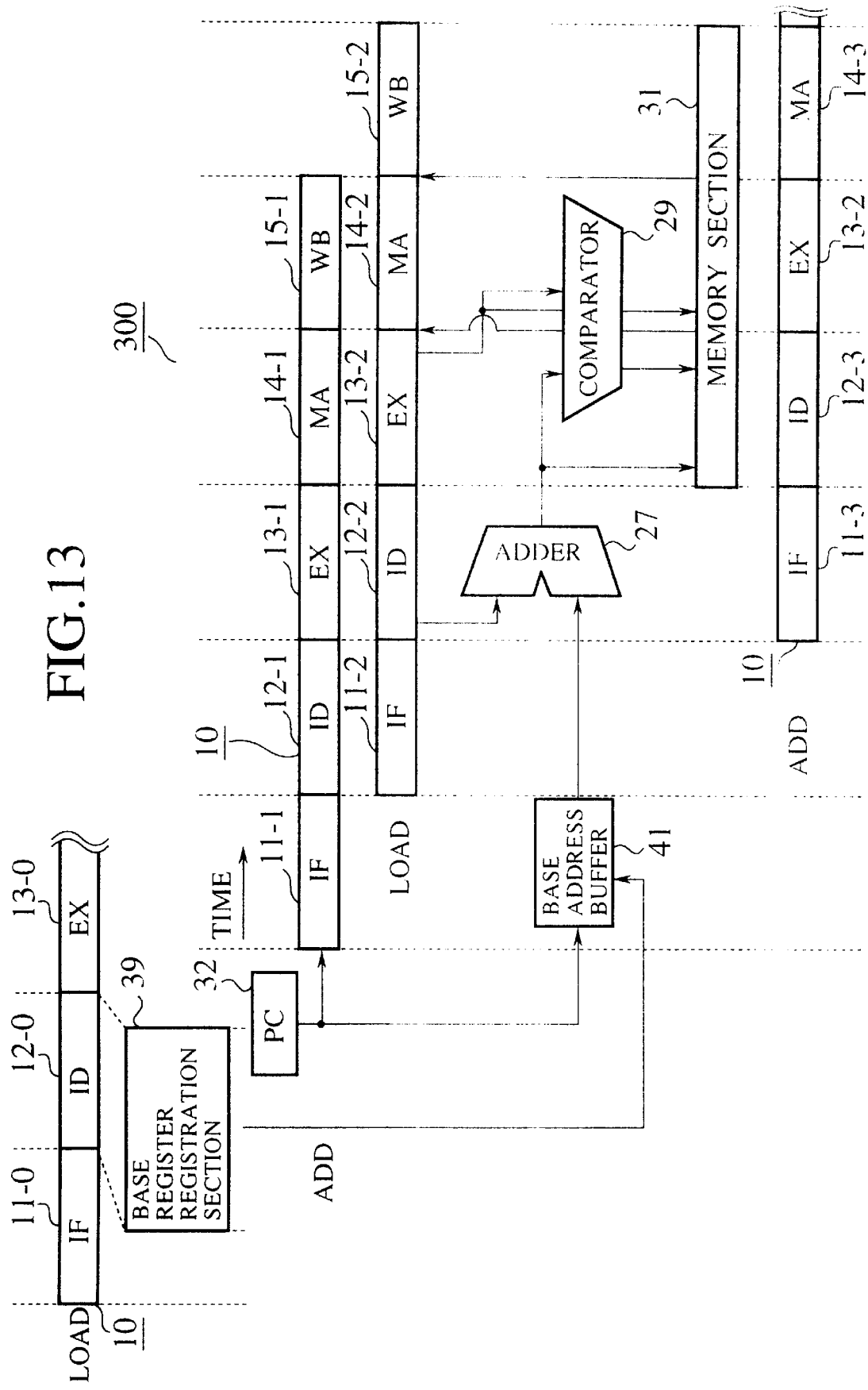
FIG. 13 is a block diagram showing a configuration of the pipelined microprocessor 300 according to the third embodiment.

FIG. 13 is a block diagram showing a configuration of the pipelined microprocessor 300 of the third embodiment according to the present invention.

The pipelined microprocessor 300 of the third embodiment according to the present invention comprises a base address buffer 41 and a base address registration section 39 instead of the base register buffer 23 incorporated in the pipelined microprocessor 100 of the first embodiment. Other components in the pipelined microprocessor 200 of the second embodiment are the same as the pipelined microprocessor 100 in configuration and operation, so that the explanation for those elements are omitted here for brevity.

The base address registration section 39 registers relationship information between a base address of a load address and an instruction which is executed before the load instruction. The base address buffer 41 stores the base address and the instruction address which are related to each other and then outputs the base address corresponding to the input instruction address.

The adder 27 calculates a predicted load address by using the base address and the offset value indicated by the load instruction transferred from the base address buffer 41 before the pipeline processing section 10 accesses a load address executed by the load instruction.

Predicted load addresses are obtained by the following procedures (31) to (34):

(31) At the IF stage 11-1 in the preceding instruction, namely the ADD instruction, the base address buffer 41 is accessed in order to get the base address. When no base address is stored, the base address buffer 41 provides a predetermined constant value instead of the base address. FIG. 14 is an explanation diagram showing the configuration of the base address buffer 41 incorporated in the pipelined microprocessor 300 of the third embodiment, as shown in FIG. 13. The base address buffer 41 has the configuration shown in FIG. 14 in which instruction addresses and corresponding base addresses are stored.

(32) When a following instruction to be executed is a LOAD instruction, the adder 27 calculates a predicted load address by using the base address obtained at the ID stage 12-2, namely at the process (31) described above and the offset in an operand field in the LOAD instruction.

(33) The memory section 31 is accessed to obtain data at the EX stage 13-2 in the LOAD instruction. At the same time, the pipeline processing section 10 calculates an actual address. The comparator 29 compares the predicted load address and the actual address in order to judge whether the predicted load address is correct or not. When no address of the ADD instruction is stored in the base address buffer 41, the base address is stored. In the registration operation, there is a limit based on the limiting of a hardware configuration. When the base register will be registered over the limit value, the registered data which has already been registered is replaced by using the Least Recently Used (LRU) method.

(34) When the address prediction is failure, required data is processed by accessing the memory section 31 at the MA stage 14-2 in the LOAD instruction in order to replace the registered data.

Thus, by using the above procedures, required data can be get earlier because the load address can be obtained at the ID stage 12-2 and the memory section 13-2 can be accessed at the EX stage 13. In other words, the load address can be calculated at the ID stage 12-2 in the LOAD instruction and the predicted load address can also be used at the EX stage 13-2 in the ADD instruction. In addition to this feature, the performance of the pipelined microprocessor can be increased because the pipelined microprocessor 300 is capable of reducing the occurrences of data hazards.

Furthermore, the number of ports in the register file can be reduced because the pipelined microprocessor 300 of the third embodiment does not access the register file, so that the hardware size of the register file can also be reduced.

Fourth embodiment.

Figure 15:
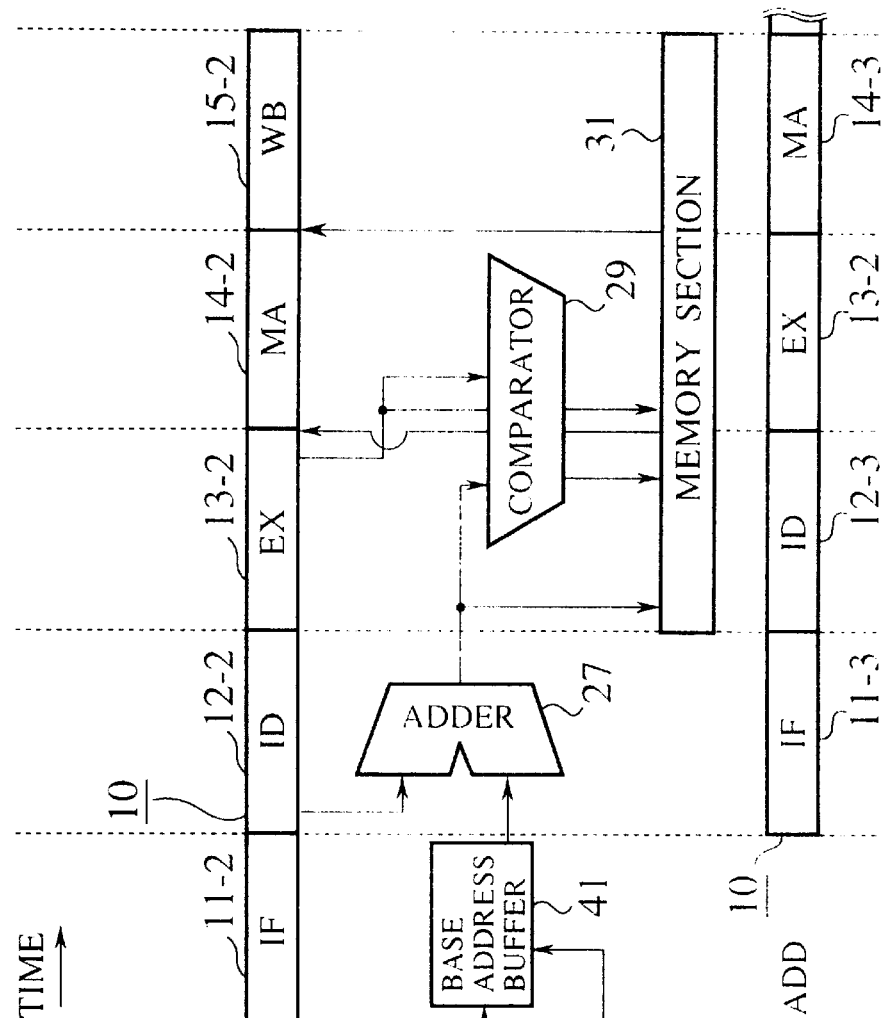
FIG. 15 is a block diagram showing a configuration of the pipelined microprocessor 400 according to the fourth embodiment.

FIG. 15 is a block diagram showing a configuration of the pipelined microprocessor 400 of the fourth embodiment according to the present invention.

The configuration of the pipelined microprocessor 400 of the fourth embodiment is equal to that of the pipelined microprocessor 300 of the third embodiment.

In the pipelined microprocessor 400 of the fourth embodiment, the base address buffer 41 is accessed at the IF stage in the LOAD instruction, not at the IF stage in the preceding instruction in the pipelined microprocessor 300.

The load address prediction will be executed in the following procedure (41) to (44):

(41) At the IF stage 11-2, the base address buffer 41 is accessed in order to get a base address. When does not store the base address, the base address buffer 41 outputs a predetermined constant value.

(42) The adder 27 calculates a predicted load address by using the base address obtained at the ID stage 12-2, namely obtained in the process (41), and the offset in an operand in the LOAD instruction.

(43) At the EX stage 13-2, the memory section 31 is accessed in order to get data. At the same time, the pipeline processing section 10 calculates an actual address. The comparator 29 compares the predicted load address with the actual address in order to judge whether the predicted load address is correct or not. When no instruction address is stored in the base address buffer 41, the base address is stored into the base address buffer 41. In the registration operation, there is a limit value based on the limiting of a hardware configuration. When the base register will be registered over the limit value, the registered data which has already been registered is replaced by using the Least Recently Used (LRU) method.

(44) When the address prediction is failure, required data is processed by accessing the memory section 31 at the MA stage 14-2 in the LOAD instruction in order to replace the registered data.

Thus, by using the above procedures, required data can be get earlier because the load address can be obtained at the ID stage 12 and the memory section 13-2 can be accessed at the EX stage 13. In other words, the load address can be calculated at the ID stage 12-2 in the LOAD instruction and the predicted load address can also be used at the EX stage 13-2 in the following ADD instruction. In addition to this feature, the performance of the pipelined microprocessor can be increased because the pipelined microprocessor 400 is capable of reducing the occurrence of data hazard.

Furthermore, since the pipelined microprocessor 400 of the fourth embodiment can perform the load address prediction in one instruction pipeline (for example, only in the LOAD instruction pipeline), the procedures of the pipelined microprocessor 400 can be easily controlled rather than that of the pipelined microprocessor 300 of the third embodiment.

Fifth embodiment.

Figure 16:
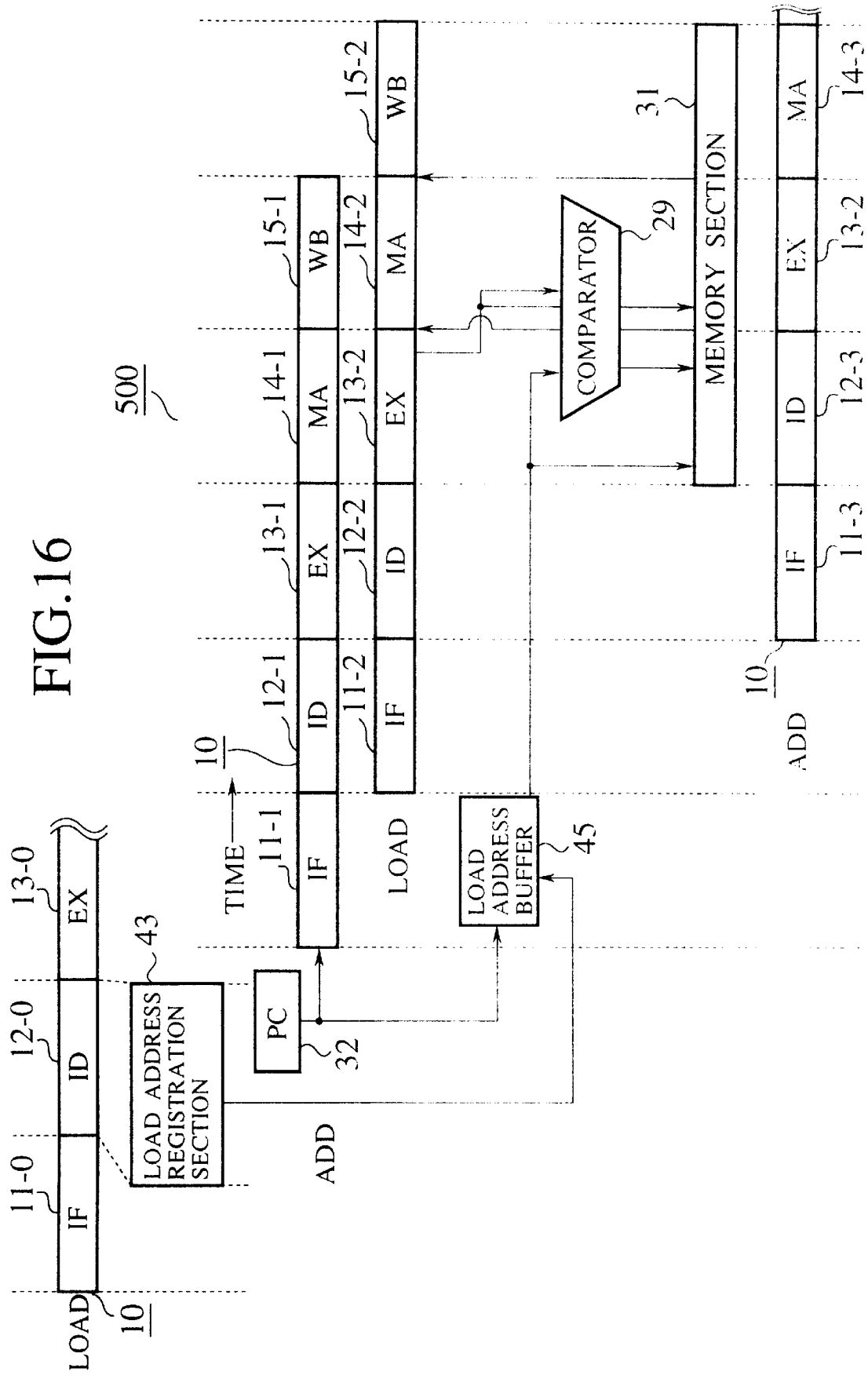
FIG. 16 is a block diagram showing a configuration of the pipelined microprocessor 500 according to the fifth embodiment.

FIG. 16 is a block diagram showing a configuration of the pipelined microprocessor 500 of the fifth embodiment according to the present invention.

In addition to the elements in the pipelined microprocessor 100 of the first embodiment, the pipelined microprocessor 500 of the fifth embodiment comprises: a load address registration section 43 and a load address buffer 45 instead of the base register registration section and the base register buffer 23 for storing register numbers, respectively, incorporated in the pipelined microprocessor 100 of the first embodiment. The load address registration section 43 registers a load address of a load instruction into a load address buffer 45 and the load address buffer 45 stored a predicted load address. The pipelined microprocessor 500 does not require no adder 27.

The load address prediction of the pipelined microprocessor 500 of the fifth embodiment will be performed by using the following processes (51) to (53):

(51) At the IF stage 11-1 in the preceding instruction, namely the ADD instruction, the load address buffer 45 is accessed in order to get a predicted load address. When no predicted load address is stored in the buffer 45, the load address buffer 45 provides a predetermined constant value instead of the predicted load address. FIG. 17 is an explanation diagram showing the configuration of the load address buffer 45 incorporated in the pipelined microprocessor 500 shown in FIG. 16.

(52) When a following instruction to be executed is a LOAD instruction, the memory section 31 is accessed in order to get data during the IF stage 11-2 to the EX stage 13-2. At the same time, the pipeline processing section 10 calculates an actual address in the EX stage 13-2. The comparator 29 then compares the predicted load address and the actual address in order to judge whether the predicted load address is correct or not. When no address of the ADD instruction is stored in the load address buffer 45, the actual address is registered. In the registration operation, there is a limit based on the limiting of a hardware configuration. When the address will be registered over the limit value, the registered data which has already been registered is replaced by using the Least Recently Used (LRU) method.

(53) When the address prediction is failure, required data is processed by accessing the memory section 31 at the MA stage 14-2 in the LOAD instruction in order to get data.

Thus, in the pipelined microprocessor 500 of the fifth embodiment, a load address can be obtained before the IF stage 11-2, so that the memory section 31 can be accessed before the EX stage 13. In other words, the load address can be obtained before IF stage 11-2 in the LOAD instruction and the predicted load address can also be used at the EX stage 13-2 in the following ADD instruction. In addition to this feature, the performance of the pipelined microprocessor can be increased because the pipelined microprocessor 500 is capable of reducing the occurrence of data hazard.

Furthermore, since no register file is incorporated in the pipelined microprocessor 500 of the fifth embodiment, the number of ports of the register file can be decreased and the hardware size of the pipelined microprocessor can also be reduced. In addition to this, because the adder 27 is not required for the pipelined microprocessor 500, the hardware size of the microprocessor can be further reduced.

Six embodiment.

Figure 18:
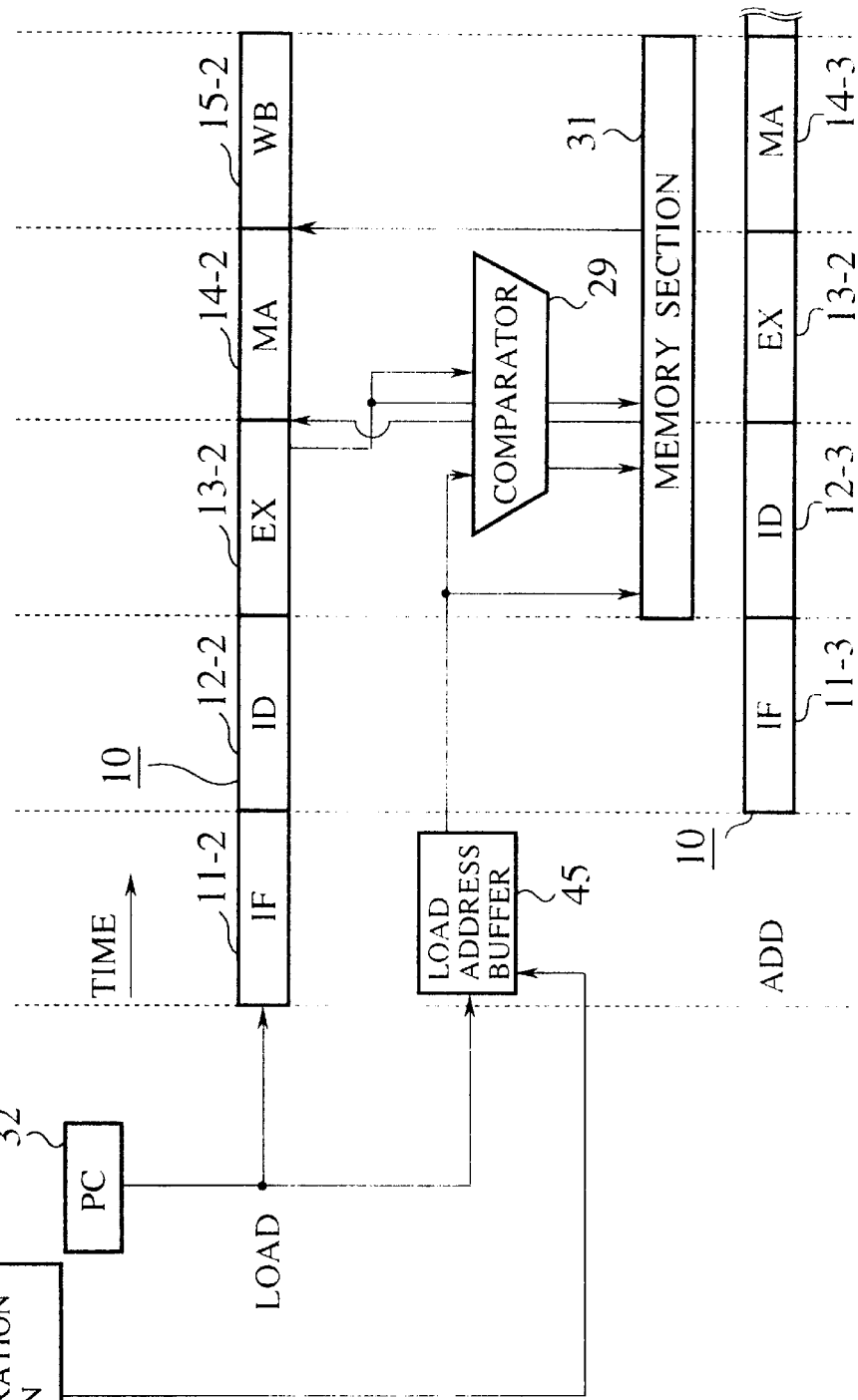
FIG. 18 is a block diagram showing a configuration of the pipelined microprocessor 600 according to the sixth embodiment.

FIG. 18 is a block diagram showing a configuration of the pipelined microprocessor 600 of the sixth embodiment according to the present invention.

The configuration of the pipelined microprocessor 600 of the sixth embodiment is equal to that of the pipelined microprocessor 500 of the fifth embodiment.

In the pipelined microprocessor 600 of the sixth embodiment, the load address buffer 45 is accessed at the IF stage 11-2 in the LOAD instruction, not at the IF stage 11-1 in the preceding ADD instruction.

The load address prediction of the pipelined microprocessor 600 of the sixth embodiment will be performed by using the following processes (61) to (63):

(61) At the IF stage 11-2 in the LOAD instruction, the load address buffer 45 is accessed in order to get a predicted load address. When no predicted load address is stored in the buffer 45, the load address buffer 45 provides a predetermined constant value instead of the predicted load address.

(62) The memory section 31 is accessed in order to get data during the ID stage 12-2 to the EX stage 13-2. At the same time, the pipeline processing section 10 calculates an actual address in the EX stage 13-2. The comparator 29 then compares the predicted load address and the actual address in order to judge whether the predicted load address is correct or not. When the address of the ADD instruction is not stored in the load address buffer 45, the actual address is registered. In the registration operation, there is a limit based on the limiting of a hardware configuration. When the address will be registered over the limit value, the registered data which has already been registered is replaced by using the Least Recently Used (LRU) method.

(63) When the address prediction is failure, required data is processed by accessing the memory section 31 at the MA stage 14-2 in the LOAD instruction.

Thus, in the pipelined microprocessor 600 of the sixth embodiment, a load address can be obtained at the IF stage 11-2, so that the memory section 31 can be accessed before the EX stage 13-2. Accordingly, required data can be obtained earlier. In other words, the load address can be obtained before ID stage 12-2 in the LOAD instruction and the predicted load address can also be used at the EX stage 13-2 in the following ADD instruction. In addition to this feature, the performance of the pipelined microprocessor can be increased because the pipelined microprocessor 600 is capable of reducing the occurrences of data hazards. In addition, because the load address prediction can be performed in one instruction operation such as only during the load instruction, the operation of the pipelined microprocessor 600 can be controlled easily rather than that of the pipelined microprocessor 400 of the fourth embodiment.

Seventh embodiment.

Figure 19:
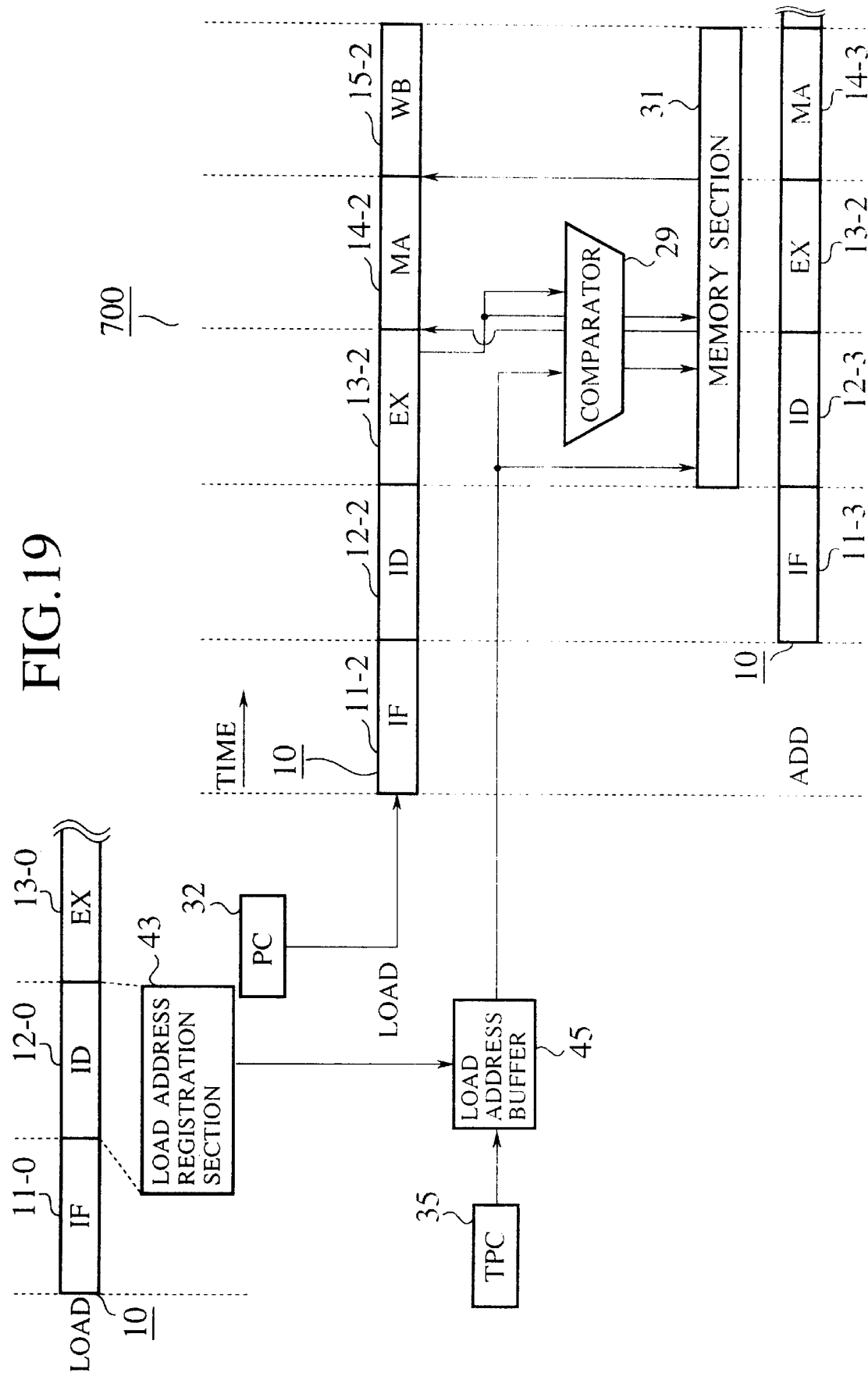
FIG. 19 is a block diagram showing a configuration of the pipelined microprocessor 700 according to the seventh embodiment.

FIG. 19 is a block diagram showing a configuration of the pipelined microprocessor 700 of the seventh embodiment according to the present invention.

The pipelined microprocessor 700 of the seventh embodiment further comprises a target program counter (TPC) 35 in addition to the configuration of the pipelined microprocessor 600 of the sixth embodiment. The TPC 35 is used for a load address prediction. That is, the TPC 35 points an instruction address whose operation is independently from that of the PC 32. The TPC 35 incorporated in the pipelined microprocessor 700 outputs an instruction address which is different in address from the instruction address designated by the PC 32. That is, the instruction address pointed by the TPC 35 is separated from the instruction address pointed by the PC 32.

Thus, by incorporating the TPC 35 in the microprocessor, both instruction addresses of LOAD instructions and load addresses can be stored into the load address buffer 45. Accordingly, it is preferable to use the pipelined microprocessor 700 of the seventh embodiment having the configuration described above when a complicated program is used. In addition to this feature, there is an advantage that this configuration of the pipelined microprocessor 700 makes it easily possible to perform maintenance.

Eighth embodiment.

Figure 20:
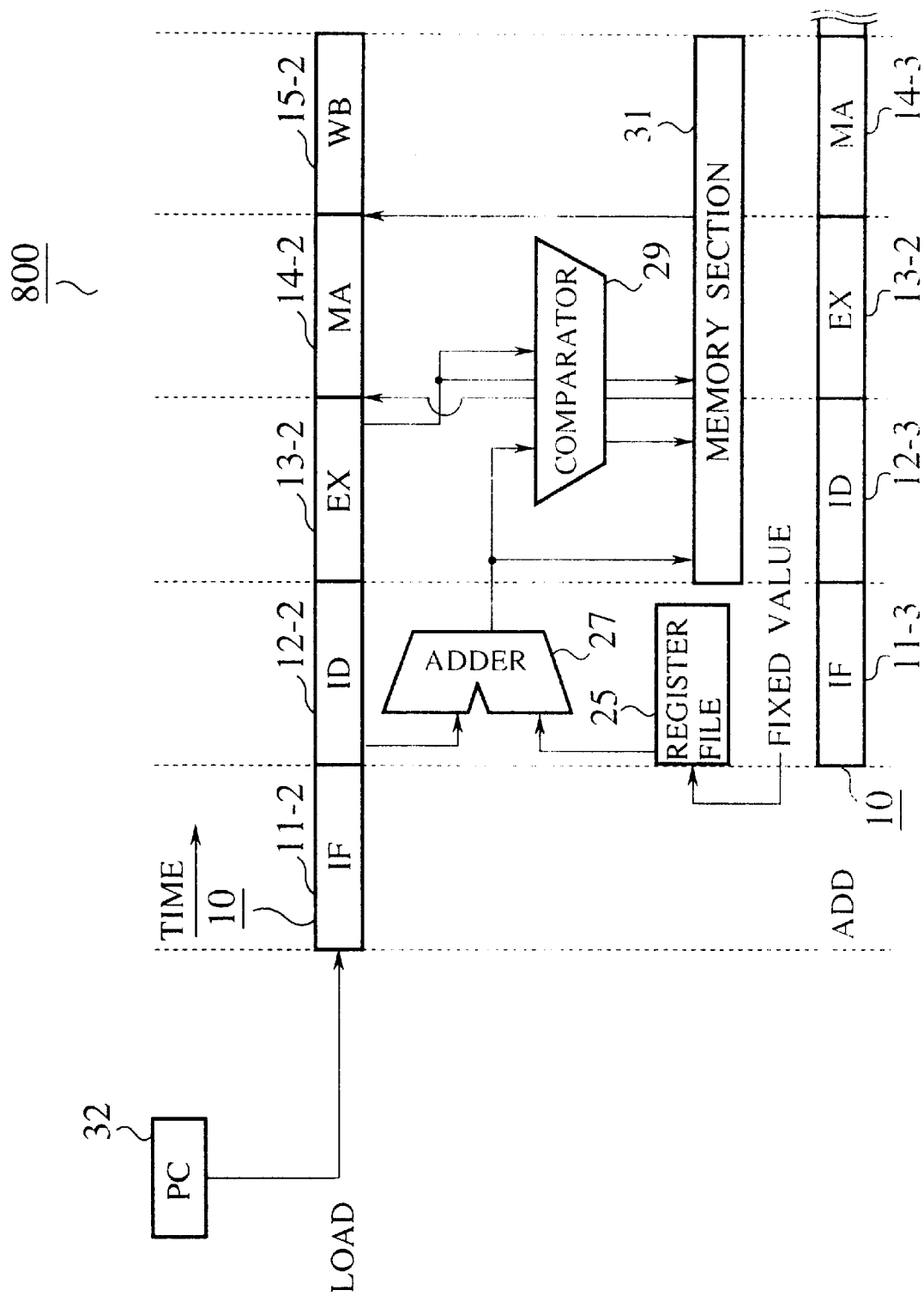
FIG. 20 is a block diagram showing a configuration of the pipelined microprocessor 800 according to the eighth embodiment.

FIG. 20 is a block diagram showing a configuration of the pipelined microprocessor 800 of the eighth embodiment according to the present invention.

In the pipelined microprocessor 800 of the eighth embodiment, the register file 25 outputs a base address indicated by the fixed number to the adder 27 instead of the base register buffer 23 incorporated in the pipelined microprocessor 100 of the first embodiment.

In general, many of microprocessors have the configuration in which the number of a register storing a base address for a LOAD instruction is fixed such as a stack pointer (SP) and the like. The pipelined microprocessor 800 of the eighth embodiment uses this feature and the pipelined microprocessor 800 outputs a fixed base register number at all times when a load address for a LOAD instruction is received. This configuration of the pipelined microprocessor 800 makes it possible to increase the ratio of the load address prediction.

The load address prediction of the pipelined microprocessor 800 of the eighth embodiment will be performed by using the following processes (81) to (84):

(81) First, the register file 25 is accessed in the IF stage 11-2 in the LOAD instruction in order to get a base address.

(82) During the ID stage 12-2, the adder 27 calculates a predicted load address by using the base address obtained at the process (81) and an offset value in an operand of the LOAD instruction.

(83) The memory section 31 is accessed in order to get data during the EX stage 13-2. At the same time, the pipeline processing section 10 calculates an actual address in the EX stage 13-2. The comparator 29 then compares the predicted load address and the actual address in order to judge whether the predicted load address is correct or not.

(84) When the load address prediction is failure, required data is processed by accessing the memory section 31 at the MA stage 14-2 in the LOAD instruction.

Thus, in the pipelined microprocessor 800 of the eighth embodiment, a load address can be obtained at the IF stage 11-2, so that the memory section 31 can be accessed at the EX stage 13-2. Accordingly, required data can be obtained earlier. In other words, the load address can be obtained at the ID stage 12-2 in the LOAD instruction and the predicted load address can also be used at the EX stage 13-2 in the following ADD instruction. In addition to this feature, the performance of the microprocessor can be increased because the pipelined microprocessor 800 is capable of reducing the occurrence of data hazard. Furthermore, because no base register buffer is required in the pipelined microprocessor 800 of the eighth embodiment, the hardware size of the pipelined microprocessor 800 can be further reduced.

Moreover, the hardware size of the pipelined microprocessor can be further reduced because no adder 27 is required when the microprocessor is formed so that a load address is directly stored in the register file 25 and is transferred to the comparator 29.

As the configurations and operations of the pipelined microprocessors 100 to 800 according to the first to eighth embodiments are described above in detail, performance of the microprocessor can be further increased when the configuration of the pipelined microprocessor 100 of the first embodiment is incorporated, because the pipelined microprocessor 100 of the first embodiment has the highest load address prediction ratio in the pipelined microprocessors 100 to 800. In addition to this, when the predicted load address is correct, it can be prevented to reduce the performance of a pipeline caused by the data hazard and it can be achieved to increase the performance of the pipelined microprocessor.

As the simulation results, the pipelined microprocessor of the present invention has the prediction ratio of approximately 73 percentages under the Dhrystone benchmark and can increase its performance by approximately 7.7 percentages.

Thus, the pipelined microprocessor and the load address prediction method according to the present invention can eliminate the occurrences of pipeline stall caused by data hazard and can increase its performance.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A pipelined microprocessor comprising:
   a pipeline processing section for executing instructions;
   a memory section for storing various types of data items used for executions of the instructions;
   a load instruction information registration section for registering information of load instructions for loading data from the memory section in the instructions;
   a load instruction information storing section for storing the information of the load instructions which will load the data from the memory section;
   an address calculation section for calculating a predicted load address during a stage before an access stage to a load address to be used in execution of the load instruction by the pipeline processing section;
   a calculation result judgement section for judging whether the predicted load address calculated by the address calculation section is correct or not; and
   an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct;
   wherein a following instruction after the load instruction is executed by using the data transferred from the memory section.

2. A pipelined microprocessor as claimed in claim 1, wherein the load instruction information registration section registers a register number of a register for storing a base address for the load address and an address of an instruction which is executed before the execution of the load instruction which are related to each other,
   the load instruction information storing section stores the register number and the instruction address and outputs the register number corresponding to an instruction address received by the load instruction information storing section, and
   the address calculation section calculates the predicted load address in a stage before the pipeline processing section accesses a load address in the execution of a load instruction by using both the register number provided from the load instruction information storing section and an offset value included in the load instruction.

3. A pipelined microprocessor as claimed in claim 2, wherein the load instruction information storing section outputs the register number corresponding to the instruction address received at an instruction fetch stage executed by the pipeline processing section.

4. A pipelined microprocessor as claimed in claim 3, wherein the load instruction information registration section registers a register number of a register for storing a base address of the load address and an address of a load instruction which are related to each other.

5. A pipelined microprocessor as claimed in claim 1, further comprising a load address prediction program counter for indicating an instruction address for an instruction to be executed,
   wherein the load instruction information registration section registers a register number of a register storing a base address of a load address, an offset value included in a load instruction and an instruction address of the load address which are related to each other to the load instruction information storing section,
   the load instruction information storing section stores the register number, the offset value, the instruction address which are related to each other and outputs the register number and the offset value related to an instruction address pointed by a load address prediction program counter, and
   the address calculation section calculates a predicted load address before an access stage in which the pipeline processing section accesses a load address in a load instruction execution by using both a base address and an offset value stored in the register file corresponding to the register number transferred from the load instruction information storing section.

6. A pipelined microprocessor as claimed in claim 1, wherein the load instruction information registration section registers a base address of a load address and an instruction to be executed before the load instruction which are related to each other to the load instruction information storing section,
   the load instruction information storing section stores the base address and the instruction address which are related to each other and outputs the base address corresponding to an instruction address received by the load instruction information storing section, and
   the address calculation section calculates a predicted load address before an access stage in which the pipeline processing section accesses a load address in a load instruction execution by using both a base address transferred from the load instruction information storing section and an offset value included in the load instruction.

7. A pipelined microprocessor as claimed in claim 1, wherein the load instruction information storing section outputs a base address corresponding to an instruction address received at an instruction fetch stage.

8. A pipelined microprocessor comprising:
   a pipeline processing section for executing instructions;
   a memory section for storing various types of data items used for executions of the instructions;
   a load instruction information registration section for registering load addresses for load instructions loaded from the memory section;
   a load instruction information storing section for storing load addresses the information of the load instructions which will load the data from the memory section;
   an address calculation section for calculating a predicted load address during a stage before an access stage to a load address to be used in execution of the load instruction by the pipeline processing section;
   a calculation result judgement section for judging whether the predicted load address calculated by the address calculation section is correct or not; and
   an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct;

wherein a following instruction after the load instruction is executed by using the data transferred from the memory section.

9. A pipelined microprocessor as claimed in claim 8, wherein the load instruction information storing section outputs a load address corresponding to the instruction address which is received at an instruction fetch stage.

10. A pipelined microprocessor as claimed in claim 8, further comprising a load address prediction program counter for indicating an instruction address for an instruction to be executed, wherein the load instruction information registration section registers a load address for the load instruction and an instruction address which are related to each other, and the load instruction information storing section stores the related load address and the instruction address which are related to each other transferred from the load instruction information registration section, and outputs a load address corresponding to the instruction address pointed by the load address prediction program counter.

11. A pipelined microprocessor as claimed in claim 1, wherein the load instruction information registration section registers information about a load instruction which is repeatedly executed in the instructions at a first execution to the load instruction information storing section.

12. A pipelined microprocessor, comprising:

a pipeline processing section for executing instructions;

a memory section for storing various types of data items used for executions of the instructions;

an address calculation section for calculating a predicted load address by using a predetermined base register and an offset value included in a load instruction during a stage before an access stage to a load address to be used in execution of the load instruction by the pipeline processing section;

a calculation result judgement section for judging whether the predicted load address calculated by the address calculation section is correct or not; and an output section for outputting data stored in the memory section corresponding to the predicted load address to the pipeline processing section when the predicted load address is correct and for outputting data stored in the memory section corresponding to the load address obtained by the execution stage of the load instruction to the pipeline processing section when no predicted load address is correct;

wherein a following instruction after the load instruction is executed by using the data transferred from the memory section.

13. A pipelined microprocessor as claimed in claim 12, wherein the calculation result judgement section inputs a predetermined value instead of the predicted load address obtained from the address calculation section and then the judgement whether the predicted load address is correct or not.

14. A load address prediction method for a pipelined microprocessor, comprising:

a load instruction information registration step for registering load instruction information in instructions to be executed;

a predicted load address calculation step for calculating a predicted load address in a stage performed before an access stage for a load address obtained by executing a load instruction by using the load instruction information;

a calculation result judging step for judging whether or not the predicted load address is correct;

an output step for outputting data corresponding to the predicted load address when the predicted load address is correct and for outputting data corresponding to the load address obtained by executing the load instruction when no predicted load address is correct; and an instruction execution step for executing following instructions after the load instruction by using the data obtained at the output step.

15. A load address prediction method for a pipelined microprocessor as claimed in claim 14, wherein the load instruction information registration step is performed by using the load instruction information including al least a register number of a register for storing a base address of the load address.

16. A load address prediction method for a pipelined microprocessor as claimed in claim 15, wherein in the address calculation step, the load address is calculated by using the register number corresponding to an instruction address received at an instruction fetch stage.

17. A load address prediction method for a pipelined microprocessor as claimed in claim 14, wherein the load instruction information registration step is performed by using the load instruction information including al least a base address of the load address or the load address.

18. A load address prediction method for a pipelined microprocessor, comprising:

a predicted load address calculation step for calculating a predicted load address in a stage performed before an access stage for a load address obtained by executing a load instruction by using a predetermined base register or an offset value included in the load instruction;

a calculation result judging step for judging whether or not the predicted load address is correct;

an output step for outputting data corresponding to the predicted load address when the predicted load address is correct and for outputting data corresponding to the load address obtained by executing the load instruction when no predicted load address is correct; and an instruction execution step for executing following instructions after the load instruction by using the data obtained at the output step.

* * * * *